Sept. 25, 1951 R. F. SMELTZER 2,569,348
SQUELCH CIRCUIT
Filed May 28, 1946
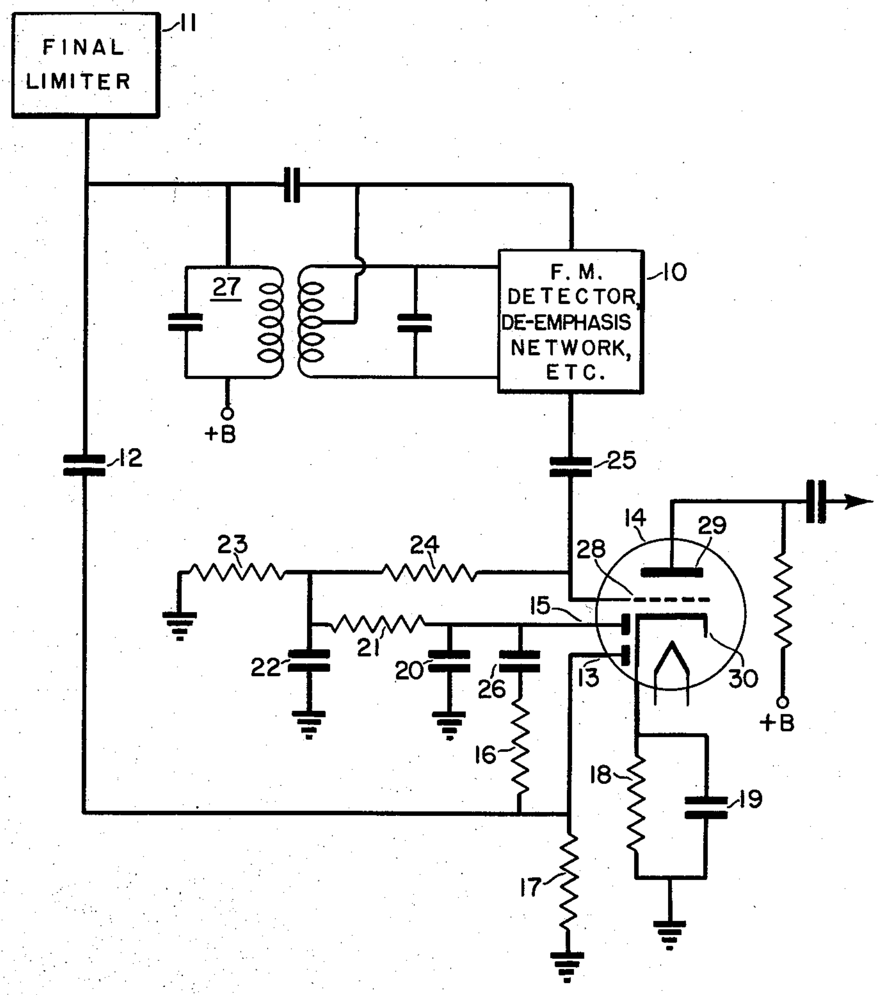
Inventor
RAYMOND F. SMELTZER
By Robert T. Killman
Attorney Patented Sept. 25, 1951 2,569,348

UNITED STATES PATENT OFFICE 2,569,348

SQUELCH CIRCUIT

Raymond F. Smeltzer, Towson, Md., assignor to Bendix Aviation Corporation, Towson, Md., a corporation of Delaware Application May 28, 1946, Serial No. 672,746

5 Claims. (Cl. 250—20)

This invention relates to circuits for the quieting of sensitive radio receivers in the absence of useful signals and more particularly to a circuit of this type for use in either frequency or amplitude modulated receivers.

A number of noise suppressing or squelch circuits have been developed for use in frequency modulation receiving equipment. Such circuits usually operate by blocking the audio amplifier of the receiver until a combined frequency and noise modulated signal is received, the magnitude of which exceeds a predetermined threshold level. Arrangements of this nature have proved unsatisfactory because the receiver tends to be sensitive to noise in noisy locations, and weak but useful frequency modulation signals often fail to operate the receiver in quiet locations. Since the squelch circuit is responsive to the combined signal and noise amplitude, it can be adjusted for satisfactory operation only in the rare location where the noise level is constant. Even in such a location most of such circuits are defective in another respect, in that a border line signal is reproduced in distorted form, modulated by an exaggerated replica of the integrated amplitude fluctuations of the signal and noise.

It is, therefore, an object of this invention to provide a squelch circuit which is responsive only to noise.

It is another object of this invention to provide a squelch circuit having two limiting conditions of equilibrium, in one of which no restriction is imposed to the free passage of signals and in the other of which the passage of signals is prevented, with only a transient interval of distortion occurring in shifting from one condition to the other.

The objects and advantages of the invention are realized by the provision of a squelch circuit in which the signal is fed to two detectors responsive to different forms of modulation. One of the detectors is responsive to the form of modulation employed in the desired signal to render the intelligence it conveys, the other being responsive only to noise and rendering an indication of the noise in a form suitable for the operation of a means for blocking a succeeding audio amplifier. Two or more rectifiers are employed in cascade in the noise detector with delayed bias regeneratively applied to each, thus establishing two limiting conditions of equilibrium in one of which the blocking means is completely inoperative and in the other of which signals are completely blocked, the passage from one of these states to the other requiring but a very short interval of time.

Other objects and advantages of the invention will become apparent from a consideration of the following specification, when taken together with the accompanying drawings, in the single figure of which there is shown a schematic diagram of a portion of a frequency modulation receiver circuit embodying the invention.

Referring now more particularly to the drawing, there is illustrated a conventional frequency modulation detector 10 connected between the limiter 11 and the first audio tube 14 of a frequency modulation receiver. The tube 14 is a dual diode-triode, the audio amplifying portion of the tube comprising the anode 29, control grid 28 and cathode 30. A pair of diode anodes 13 and 15 are associated with the cathode 30. A condenser 12 provides a connection between the output circuit 27 of the limiter 11 and the diode anode 13. The diode anode 15 is connected through a condenser 26 and a resistor 16 to the anode 13, and through a condenser 20 to ground. A resistor 17 is connected between the anode 13 and ground. The junction of the condensers 20 and 26 is connected to ground by a resistor 21 in series with a parallel circuit comprising a resistor 23 and the condenser 22. The junction of resistors 21 and 23 is connected to the control electrode 28 through a resistor 24. A condenser 25 provides coupling means to the control electrode for signals issuing from the detector 10. A resistor 18 which is shunted by a condenser 19 provides a connection between the cathode 30 of the tube 14 and ground.

In operation, noise signals appearing as an amplitude modulated disturbance in the output of the limiter stage 11 are applied to the anode 13 of the tube 14 through the condenser 12. It is to be noted that no detection of these signals will take place until their amplitude exceeds the bias voltage caused by the triode space current flowing through the resistor 18. If the noise signals are above this threshold, amplitude detected signals will appear across the diode load resistor 17. These detected signals are applied to the anode 15 through the resistor 16 and the blocking condenser 26. It will be seen that the signal applied to the anode 15 must also be greater than the voltage across the resistor 18 for current flow. If this threshold level is exceeded the signals detected at the anode 13 will be rectified and integrated by the circuit comprising the anode 15, the integrating network comprising the resistor 21 and the condenser 22 and the further integrating network comprising the resistor 16 and the condenser 20. The integrated signal is applied to the control electrode of the tube 14 through the decoupling resistor 24 where it appears as a bias which tends to decrease the flow of anode current through the triode 14. This decrease in anode current causes a decrease of voltage across the resistor 18 which lowers the operating threshold of the system. It will be manifest that the above described arrangement is highly regenerative and that the triode 14 is substantially in a non-conducting state irrespective of the amplitude of the applied noise signal provided it exceeds the threshold value. Operation of the tube 14 as described above requires that a minimum bias greater than one half cut-off value be used.

The use of the two RC combinations 16, 20 and 21, 22, and the connection of the final load resistor 23 across their output, causes the tube 14 to unblock at a rate commensurate with the rate at which it blocks, thus holding the cross-over time between stages of equilibrium to a very small value. If it is not considered necessary to restrict cross-over time to such values, either of the RC combinations 16, 20 or 21, 22 may be dispensed with and the load resistor 23 may be connected to ground from any portion of the circuit between the anode 15 and the control grid 28 of the tube 14.

Although a dual diode-triode type of tube is illustrated, it will be manifest that separate tubes may be used if desired. This may be necessary if an excessive degree of coupling is found to be caused by the construction of the combination tube.

Since many circuit variations falling within the scope of the invention as defined by the appended claims will suggest themselves to those skilled in the art, the invention is not to be considered as limited to the embodiments disclosed herein.

What is claimed is:

1. In a receiver of radiant energy signals: a squelch circuit comprising a detector responsive to the energy of a desired signal; an electric discharge device comprising an anode, a cathode and a control electrode; means impressing the output of said detector upon said control electrode; a resistance connected between said cathode and ground; a condenser shunting said resistance; a pair of auxiliary anodes associated with said cathode and constituting with said cathode a pair of diodes; means connecting said diodes in cascade; means impressing the energy applied to said detector upon the first of said cascaded diodes; means integrating the output of said diodes and means impressing the integrated output upon said control grid.

2. In a receiver of radiant energy signals: a squelch circuit comprising a detector responsive to the energy of a desired signal; an electric discharge device comprising an anode, a cathode and a control electrode; means impressing the output of said detector upon said control electrode; a resistance connected between said cathode and ground; a condenser shunting said resistance; a pair of rectifiers connected in cascade, each of said rectifiers having an anode and a cathode, the cathodes of said rectifiers and said electric discharge device all being directly connected to a common point, means for connecting the anodes of said rectifiers to ground, whereby a bias will be impressed upon said rectifiers upon the occurrence of space current flow through said discharge device; means impressing the energy applied to said detector upon the first of said cascaded rectifiers; means integrating the output of said rectifiers and means impressing the integrated output upon said control grid.

3. In a receiver of radiant energy signals; a squelch circuit comprising a detector responsive to the energy of a desired signal; an electric discharge device comprising an anode, a cathode and a control electrode; means impressing the output of said detector upon the said control electrode; a pair of rectifiers connected in cascade; means impressing on said rectifiers a bias responsive to space current flow through said device; means impressing the energy applied to said detector upon the first of said cascaded rectifiers; means integrating the output of said rectifiers and means impressing the integrated output upon said control grid.

4. In a receiver of radiant energy signals: a squelch circuit comprising a detector responsive to the energy of a desired signal; an audio amplifier; means impressing the output of said detector upon the input of said amplifier; a pair of rectifiers connected in cascade; means biasing said rectifiers in response to space current flow through said amplifier; means impressing the energy applied to said detector on the first of said cascaded rectifiers; means integrating the output of said rectifiers and means impressing the integrated output upon the input of said amplifier.

5. An electrical signal transmission circuit including a space discharge path and having two conditions of stable equilibrium, in the first of which current flows in said path and in the second of which said path is non-conducting, comprising: a control electrode for regulating current flow in said path; an impedance in said path across which is derived by said current flow a biasing voltage for said control electrode; a pair of rectifiers biased by said derived voltage; means applying signal voltage to a first of said rectifiers; means applying the alternating portion of the output of said first rectifier to the second of said rectifiers; and means integrating the output of said second rectifier and applying said integrated output to said control electrode.

RAYMOND F. SMELTZER.

REFERENCES CITED

The following references are of record in the file of this patent:

UNITED STATES PATENTS

| Number | Name | Date |
|---|---|---|
| 2,151,739 | Burrill | Mar. 28, 1939 |
| 2,231,371 | Roberts | Feb. 11, 1941 |
| 2,233,339 | Brown | Feb. 25, 1941 |
| 2,300,876 | Dickinson | Nov. 3, 1942 |
| 2,301,607 | Bollinger | Nov. 10, 1942 |
| 2,370,216 | Worcester | Feb. 27, 1945 |
| 2,372,934 | Campbell | Apr. 3, 1945 |
| 2,400,948 | Peterson | May 28, 1946 |
| 2,452,436 | Crosby | Oct. 26, 1948 |

FOREIGN PATENTS

| Number | Country | Date |
|---|---|---|
| 499,774 | Great Britain | Jan. 30, 1939 |